United States Patent
Zhou et al.

(10) Patent No.: US 10,271,053 B2
(45) Date of Patent: Apr. 23, 2019

(54) MULTISTAGE PANIC RATE CONTROL SCHEME FOR ENCODERS

(71) Applicant: ARRIS Enterprises, Inc., Suwanee, GA (US)

(72) Inventors: Wei Zhou, Milpitas, CA (US); Swaroop Chanda, Santa Clara, CA (US); Wayne D. Michelsen, Menlo Park, CA (US); Jane Perera, Saratoga, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 601 days.

(21) Appl. No.: 15/002,362

(22) Filed: Jan. 20, 2016

(65) Prior Publication Data

US 2017/0208332 A1    Jul. 20, 2017

(51) Int. Cl.
*H04N 19/136* (2014.01)
*H04N 19/124* (2014.01)
*H04N 19/50* (2014.01)
*H04N 19/115* (2014.01)
*H04N 19/152* (2014.01)
(Continued)

(52) U.S. Cl.
CPC ......... *H04N 19/136* (2014.11); *H04N 19/115* (2014.11); *H04N 19/124* (2014.11); *H04N 19/152* (2014.11); *H04N 19/179* (2014.11); *H04N 19/194* (2014.11); *H04N 19/50* (2014.11); *H04N 19/132* (2014.11)

(58) Field of Classification Search
USPC .................................................. 375/240.03
See application file for complete search history.

(56) References Cited

U.S. PATENT DOCUMENTS 5,801,779 A  *  9/1998  Uz ...................... H04N 19/147
                                                      375/240.05
5,990,955 A  *  11/1999  Koz .................... H04N 19/176
                                                      375/240.01
(Continued)

FOREIGN PATENT DOCUMENTS

EP    1149498 A1 * 10/2001 ........... H04B 7/2612
EP    1149498 A1   10/2001

OTHER PUBLICATIONS

PCT Search Report & Written Opinion, Re: Application No. PCT/US2017/013435, dated Mar. 30, 2017.

*Primary Examiner* — William C Vaughn, Jr.
*Assistant Examiner* — Joseph Daniel A Towe
(74) *Attorney, Agent, or Firm* — Thomas A. Ward

(57) ABSTRACT

A method of encoding video is provides encoding of panic scenes efficiently. The method includes receiving an input video at an encoder, reviewing lookahead information from a second encoder that processed the input video ahead of the encoder that indicates positions of panic scenes within the input video that caused the second encoder to enter a panic encoding mode during which it skipped the encoding of frames, entering a pre-panic stage with the encoder ahead of said panic scenes, entering a semi-panic stage with the encoder during the panic scenes when it produces a bitstream having a number of bits exceeding a predetermined data size within an encoder buffer, and entering a full panic stage when the semi-panic stage does not bring the number of bits in the bitstream below the predetermined data size.

7 Claims, 7 Drawing Sheets

(51) Int. Cl.
*H04N 19/179* (2014.01)
*H04N 19/194* (2014.01)
*H04N 19/132* (2014.01)

(56) References Cited

U.S. PATENT DOCUMENTS

| | | | |
|---|---|---|---|
| 2002/0067768 A1* | 6/2002 | Hurst | H04N 21/23406 375/240.03 |
| 2006/0050789 A1* | 3/2006 | Gisquet | H04N 19/172 375/240.23 |
| 2007/0171988 A1* | 7/2007 | Panda | H04N 19/172 375/240.29 |
| 2012/0121229 A1* | 5/2012 | Lee | H04N 5/76 386/224 |
| 2016/0205398 A1* | 7/2016 | Novotny | H04N 19/51 375/240.02 |
| 2017/0179822 A1* | 6/2017 | Kobayashi | H02M 3/158 |

\* cited by examiner

| Panic Level | Panic Control Actions |
|---|---|
| 0 | - No Panic Control, or Pre-Panic Control |
| 1 | - Discard All AC Coefficients of B-Frames |
| 2 | - Discard All AC Coefficients of B-Frames<br>- Discard All AC Coefficients of P-Frames, Except the First |
| 3 | - Discard All AC and DC Coefficients of B-Frames<br>- Discard All AC and DC Coefficients of P-Frames |
| 4 | - Skip B-Frames<br>- Discard All AC and DC Coefficients of P-Frames |
| 5 | - Skip B-Frames<br>- Skip P-Frames |

FIG. 5

| Panic Level | Panic Level Rate Increase | Panic Level Rate Decrease |
|---|---|---|
| 0 | 1 Level For Each Panic Sub-GOP | N/A |
| 1 | 1 Level For Each Panic Sub-GOP | 1 Level For Every 3 Non-Panic Sub-GOPs in a Row |
| 2 | 1 Level For Each Panic Sub-GOP | 1 Level For Every 3 Non-Panic Sub-GOPs in a Row |
| 3 | 1 Level For Each Panic Sub-GOP | 1 Level For Every 2 Non-Panic Sub-GOPs in a Row |
| 4 | 1 Level For Each Panic Sub-GOP | 1 Level For Each Non-Panic Sub-GOP |
| 5 | N/A | 1 Level For Each Non-Panic Sub-GOP |

FIG. 6

MULTISTAGE PANIC RATE CONTROL SCHEME FOR ENCODERS

TECHNICAL FIELD

The present disclosure relates to the field of digital video encoding, particularly a multistage panic rate control scheme for encoders.

BACKGROUND

Distribution and consumption of digitally encoded video has largely eclipsed that of analog video. However, digital video encoders can still sometimes struggle with encoding video that includes complex and finely detailed scenes. For example, encoders can be set to attempt to achieve a target bitrate in the output bitstreams they produce, but encoding scenes with a low bitrate can decrease picture quality and/or lower detail in the output video.

Many encoders especially struggle with video that suddenly increase their complexity, such as at an abrupt scene change from a simple scene without much detail to a much more complex scene with a lot of fine detail. Encoders can be caught off guard by a sudden complexity change, and often attempt to encode a suddenly more complex scene with a quality level more appropriate for the earlier simple scene. When high quality encoding was being performed for the simple scene, encoding a more complex scene with the same quality settings can lead to a large increase in the number of bits being produced as the encoder attempts to capture the fine details of the complex scene. This jump in bitrate can cause buffer overflow, as the output bitstream can suddenly become larger than the encoder's buffer can hold.

When this type of buffer overflow occurs, many encoders resort to a panic mode in which they begin skipping the encoding of one or more frames until enough memory is regained in the encoder's buffer. Skipping frames can result in choppy or jerky video, which can often be noticed by viewers.

As is common, most encoders frequently attempt to refer to frames they have already encoded when coding new frames. This can decrease the number of bits produced in the output bitstream. For example, the encoder can describe changes between a new frame and other already-encoded frames, rather than encoding the entirety of the new frame.

However, when an encoder enters panic mode and skips frames, when it resumes encoding frames there can be fewer already-encoded frames to refer to when encoding new frames. The encoder may need to start encoding the entirety of new frames, which produces more bits than referring to already-encoded frames. As such, resuming encoding can lead to a spike in the number of bits being produced, which runs the risk of again overflowing the encoder's buffer.

Overproducing bits in an output bitstream can also cause other problems down the line when the encoder is a part of a larger system, such as a statistical multiplexer. For example, the overproduced bits can exceed the bandwidth allocated by the multiplexer, leading to data dropping on the multiplexer or delayed arrival to decoding devices.

SUMMARY

What is needed is a multistage panic rate control scheme for video encoders, in which at least two encoders separately encode the same input video. One encoder should encode the video at least partially before another encoder, such that it can identify for the encoder panic scenes in the video that caused it to go into panic mode and skip frames. The other encoders should be able to adaptive move between various levels of panic control actions, even before reaching an identified panic scene, to get the bitrate of its output bitstream under control and prepare for the panic scene, to reduce the chances of overflowing its buffer and/or skipping frames.

In one embodiment, the present disclosure provides for a method of encoding video, the method comprising receiving an input video at an encoder, the encoder being configured to encode the input video into an output bitstream at least temporarily stored in an encoder buffer, reviewing lookahead information with the encoder, the lookahead encoder being information provided from a second encoder that separately encoded the input video at least partially ahead of the encoder, wherein the lookahead information indicates positions of one or more panic scenes within the input video at which the second encoder produced too many bits to fit in a lookahead encoder buffer and caused the second encoder to enter a panic encoding mode during which it skipped the encoding of one or more frames, entering a pre-panic stage with the encoder ahead of the panic scenes, entering a semi-panic stage with the encoder during the panic scene when the output bitstream has a number of bits exceeding a predetermined data size within the encoder buffer, and entering a full panic stage when the semi-panic stage does not bring the number of bits in the output bitstream below the predetermined data size.

In another embodiment, the present disclosure provides for a method of encoding video, the method comprising receiving an input video, routing frames of the input video to a lookahead encoder and to a frame buffer, processing the frames with the lookahead encoder into a lookahead bitstream and temporality storing bits of the lookahead bitstream in a lookahead encoder buffer, generating lookahead information with the lookahead encoder and storing the lookahead information in a lookahead information queue, wherein the lookahead information indicates whether or not the lookahead encoder encoded portions of the lookahead bitstream using a panic rate control scheme to avoid overflowing the lookahead encoder buffer, loading the frames into a primary encoder from the frame buffer, such that the primary encoder receives the frames on a delayed basis relative to the lookahead encoder, reviewing the lookahead information with the primary encoder to determine which portions of the input video caused the lookahead encoder to process portions of the lookahead bitstream using the panic rate control scheme, and in response encoding the portions of the input video with a multistage panic rate control scheme comprising a pre-panic stage during which the primary encoder gradually reduces a quantization parameter while encoding the portions of the input video, a semi-panic stage during which the primary encoder discards at least some transform coefficients while encoding the portions of the input video, and a full panic stage during which the primary encoder skips the encoding of at least some frames within the portions of the input video, wherein the primary encoder is configured to adaptively move between the pre-panic stage, the semi-panic stage, and the full panic stage to keep an amount of data stored within the primary encoder buffer below a predetermined threshold.

In another embodiment, the present disclosure provides for a dual-pass encoder comprising a lookahead encoder coupled with a lookahead encoder buffer and a lookahead information queue, the lookahead encoder being configured to encode an input video into a lookahead bitstream and temporarily store bits of the lookahead bitstream in the lookahead encoder buffer, and the lookahead encoder being configured to generate and store lookahead information in the lookahead information queue, wherein the lookahead information describes whether or not the lookahead encoder encoded portions of the lookahead bitstream using panic rate control to avoid overflow of the lookahead encoder buffer, and a primary encoder coupled with a primary encoder buffer and the lookahead information queue, such that the primary encoder has access to the lookahead information, wherein the primary encoder is configured to separately encode the input video on a delayed basis relative to the lookahead encoder, the primary encoder being configured to encode portions of the input video using a multistage panic rate control scheme when the lookahead information indicates that the lookahead encoder encoded corresponding portions of the lookahead bitstream using panic rate control.

BRIEF DESCRIPTION OF THE DRAWINGS

Further details of the present invention are explained with the help of the attached drawings in which:

FIG. 5 depicts an exemplary embodiment in which a multistage panic rate control scheme has six granular levels, with each level specifying the type of data to discard or skip at that level.

FIG. 6 depicts an exemplary embodiment of rules a primary encoder can follow to control how quickly the Panic Level can be changed in an embodiment of the multistage panic rate control scheme that has six granular levels, such as the embodiment shown in FIG. 5.

DETAILED DESCRIPTION

Figure 1:
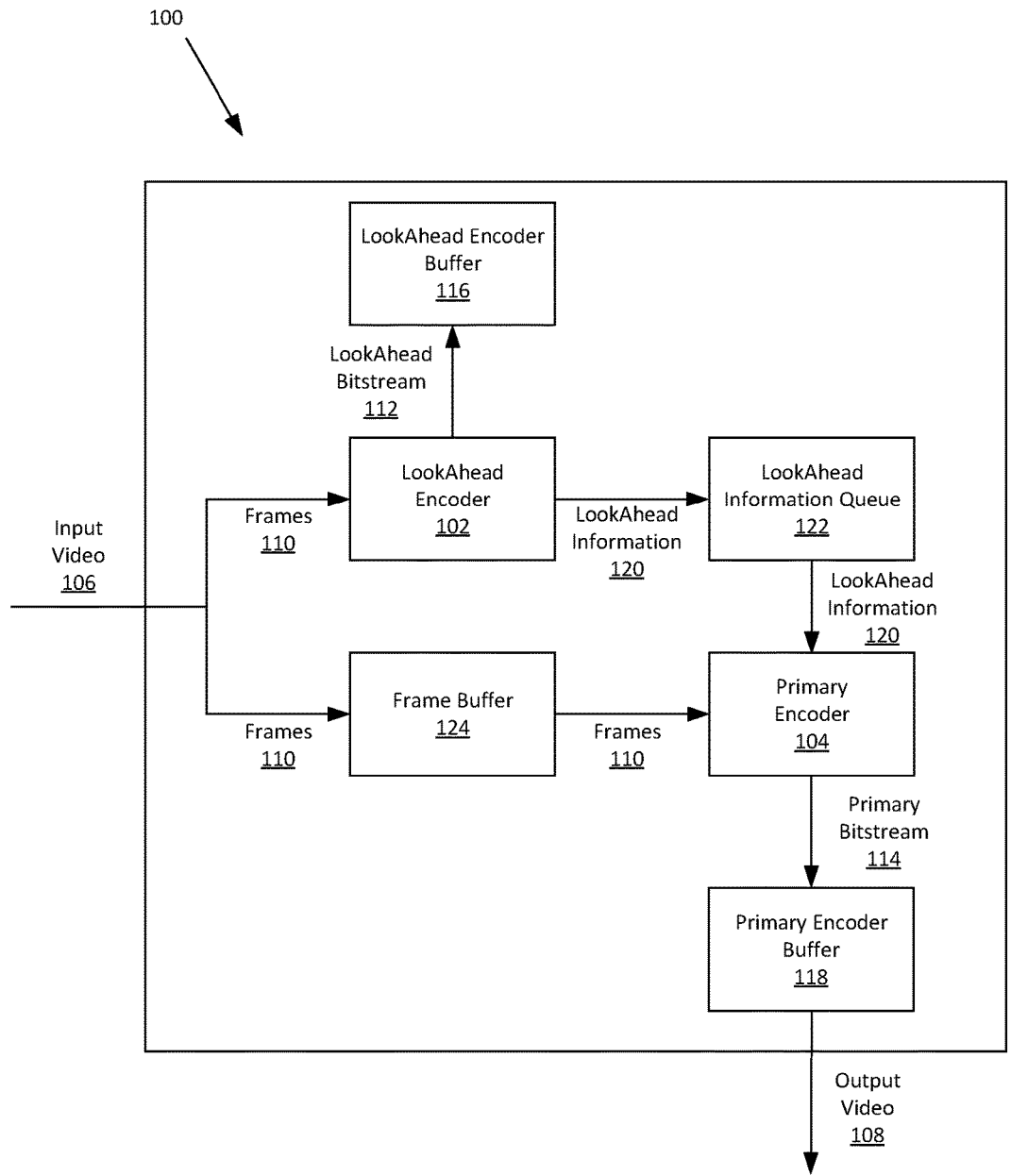
FIG. 1 depicts an embodiment of a dual-pass encoder.

FIG. 1 depicts an embodiment of a dual-pass encoder 100. A dual-pass encoder 100 can comprise a lookahead encoder 102 and a primary encoder 104. The lookahead encoder 102 and the primary encoder 104 can each be video encoders comprising processors, memory, circuits, and/or other hardware and software elements configured to encode, transcode, and/or compress input video 106 into output video 108.

The input video 106 can comprise a series of frames 110. In some embodiments or situations the input video 106 can be raw and/or uncompressed video, while in other embodiments or situations the input video 106 can have been partially pre-processed or compressed by other equipment. The dual-pass encoder 100 can receive input video 106 from a source. By way of a non-limiting example, the input video 106 can be received by the dual-pass encoder 100 over a network or other data connection from a broadcaster, content provider, or any other source. By way of another non-limiting example, the input video 106 can be a file loaded to the dual-pass encoder 100 from a hard disk or other memory storage device connected to the dual-pass encoder 100.

The lookahead encoder 102 and the primary encoder 104 can each be configured to process the frames 110 of the input video 106 to generate an output bitstream, such as encoding the input video 106 into a different format and/or compressing the input video 106 into a smaller size so that it can be more efficiently stored or transmitted. By way of a non-limiting example, the output video 108 produced by the dual-pass encoder 100 can be an output bitstream that can be decoded and/or decompressed by other devices for playback.

Figure 2:
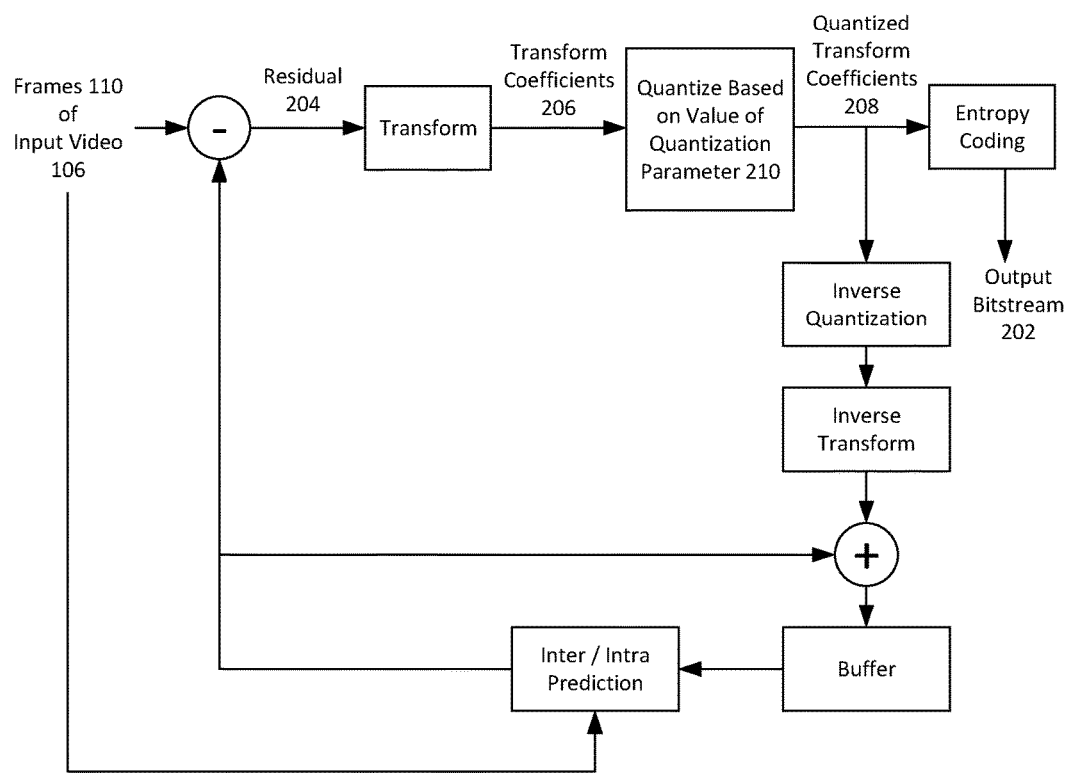
FIG. 2 depicts a flow chart for a method of generating an output bitstream from an input video with an encoder.

By way of a non-limiting example, FIG. 2 depicts a flow chart for a method of generating an output bitstream 202 from an input video 106 with an encoder, such as the lookahead encoder 102 or the primary encoder 104. An encoder can be configured to generate an output bitstream 202 from frames 110 of an input video 106 according to a video coding format and/or compression standard, such as MPEG-2, H.264/MPEG-4 AVC (Advanced Video Coding), HEVC (High Efficiency Video Coding), or any other format.

In many video coding formats or compression standards, input frames 110 can be broken into smaller sections, such as macroblocks used in H.264 or coding tree units used in HEVC. Each smaller section of a frame 110 can be coded with intra-prediction or inter-prediction. Coding a section of a frame 110 with intra-prediction uses spatial prediction based on other similar sections of the same frame 110. Coding a section with inter-prediction uses temporal prediction based on similar sections of the same frame 110 or a different frame 110, such as a preceding or subsequent frame 110 in the input video 106.

A frame 110 with sections encoded entirely with intra-prediction can be referred to as an "I-frame." I-frames can be encoded or decoded independently from other frames 110, as each of its sections can be coded with reference to other sections of the same frame 110. Frames 110 with at least some sections encoded with inter-prediction can be referred to as "P-frames" when the inter-predicted sections refer back to sections of previous frames 110, or as "B-frames" when the inter-predicted sections refer to sections of both previous frames 110 and subsequent frames 110.

An encoded output bitstream 202 can comprise a succession of groups of pictures (GOPs), with each GOP comprising a sequence of encoded frames 110. In some embodiments or situations, each GOP can begin with an I-frame that can be independently decoded, followed by P and/or B frames that can be decoded with reference to other frames 110 in the GOP. In some embodiments, an encoder can process each frame 110 individually, a group of successive frames within a GOP together as a sub-GOP, or a full GOP. By way of a non-limiting example, in some embodiments a sub-GOP can comprise consecutive frames 110 positioned between P and/or I frames in a GOP, such as a group of four frames 110.

As shown in FIG. 2, differences between sections of a frame 110 and other sections they reference in the same or other frames 110 through inter-prediction or intra-prediction can be encoded to save space and bandwidth, rather than encoding the entire frame 110. These differences, which can be referred to as the residual 204 of a frame 110, can be encoded by performing a spatial transform on the residual 204 to produce transform coefficients 206. By way of a non-limiting example, a frame's residual 204 can be transformed with a Discrete Cosine Transform (DCT) to produce DC and AC transform coefficients 206. Each resulting transform coefficient 206 can then be quantized into one of a finite number of possible values to create a quantized transform coefficient 208.

The finite number of possible values for the quantized transform coefficients 208 can be dependent on the value of a quantization parameter 210. The value of the quantization parameter 210 can indicate the step size between each possible value for the quantized transform coefficients 208. Decreasing the value of the quantization parameter 210 increases the number of possible quantized values for the quantized transform coefficients 208, such that finer details of the residual 204 can be encoded with different quantized values. As such, decreasing the quantization parameter 210 can often lead to more bits in the output bitstream 202 and thereby improve visual quality. In contrast, increasing the value of the quantization parameter 210 decreases the number of possible quantized values for the quantized transform coefficients 208, such that some details of the residual 204 can be lost when they are quantized into the same value. As such, increasing the quantization parameter 210 can often lead to fewer bits in the output bitstream 202 and thereby decrease visual quality.

Encoders can use rate control schemes while processing input video 106 to control the allocation of bits in the output bitstream 202 they produce. One such rate control scheme can be to dynamically adjust the value of the quantization parameter 210 to adjust the bitrate and picture quality of the output bitstream 202, as lowering the quantization parameter 210 can result in a higher bitrate while increasing the quantization parameter 210 can result in a lower bitrate. By way of a non-limiting example, encoders can use rate control to vary the quantization parameter 210 in an attempt to achieve an average target bitrate in their output bitstream 202 while optimizing picture quality.

After the transform coefficients 206 have been quantized into quantized transform coefficients 208 based on the value of the quantization parameter 210, the quantized transform coefficients 208 can be encoded as part of an output bitstream 202. By way of a non-limiting example, quantized transform coefficients 208 can be entropy coded as part of generating an output bitstream 202.

As shown in FIG. 2, quantized transform coefficients 208 can also be inverse quantized and inverse transformed, and the result can then combined with the residual 204 to recreate frames 110 that can be held in a buffer within the encoder to assist with inter prediction and/or intra prediction of subsequent frames 110 from the input video 106. By way of a non-limiting example, an encoder can encode a P-frame in a GOP with reference to another frame 110 in the GOP that has already been encoded, and the encoder can access and/or reference that preceding frame 110 in the buffer when coding the new P-frame.

Returning to FIG. 1, the output bitstream 202 generated by the lookahead encoder 102 can be referred to as a lookahead bitstream 112, while the output bitstream 202 generated by the primary encoder 104 can be referred to as a primary bitstream 114. The lookahead encoder 102 can comprise or be linked to a lookahead encoder buffer 116. The lookahead encoder buffer 116 can be a digital memory element that can temporarily store bits of the lookahead bitstream 112. Similarly, the primary encoder 104 can comprise or be linked to a primary encoder buffer 118. The primary encoder buffer 118 can be a digital memory element that can temporarily store bits of the primary bitstream 114.

The dual-pass encoder 100 can use bits of the primary bitstream 114 stored in the primary encoder buffer 118 as the output video 108 it can transmit to other devices.

The lookahead encoder buffer 116 and/or primary encoder buffer 118 can temporarily store bits of the output bitstreams 202, such that data stored in the buffers can be continually or periodically overwritten by newer data as more and more of the output bitstreams 202 are produced. By way of a non-limiting example, in some embodiments the lookahead encoder buffer 116 can store bits from the last N number of seconds of encoded frames 110 in the lookahead bitstream 112, with older data being continually or periodically discarded to make room for newer data.

The lookahead encoder 102 can additionally generate lookahead information 120 about the lookahead bitstream 112. Lookahead information 120 can include information about the bitrate and/or complexity of encoded frames 110, values of the quantization parameter 210, rate control status information, scene change information, the number of bits from the lookahead bitstream 112 currently stored within the lookahead encoder buffer 116, and/or any other information. The lookahead encoder 102 can comprise or be linked to a lookahead information queue 122, a digital memory location that is linked to, or accessible by, the primary encoder 104. The lookahead encoder 102 can at least temporarily store lookahead information 120 about the lookahead bitstream 112 in the lookahead information queue 122, such that the primary encoder 104 can access the lookahead information 120.

The lookahead encoder 102 can be configured to process the input video 106 at least partially ahead of the primary encoder 104, such that the primary encoder 104 can use the lookahead information 120 in the lookahead information queue 122 to see how the lookahead encoder 102 performed during its earlier processing of the input video 106. The primary encoder 104 can thus attempt to process the input video 106 differently and/or more efficiently than the lookahead encoder 102 when it determines that the lookahead encoder 102 encountered problems encoding the input video 106.

The primary encoder's processing of the input video 106 can be delayed relative to the lookahead encoder's processing of the input video 106 by temporarily holding copies of frames 110 in a frame buffer 124. After the lookahead encoder 102 has finished its processing of particular frames 110, copies of those same frames 110 can be released from the frame buffer 124 to the primary encoder 104. The primary encoder 104 can then encode its copies of the frames 110 with the benefit of the lookahead information 120.

As discussed above, the lookahead encoder 102 can use a rate control scheme to manage the bitrate of the lookahead bitstream 112, such as by varying the value of a quantization parameter 210 in an attempt to achieve an average target bitrate while optimizing picture quality. However, when the size of the data held within the lookahead encoder buffer 116 meets or exceeds the capacity of the lookahead encoder buffer 116, the lookahead encoder 102 can move from a normal rate control scheme to a panic rate control scheme in an attempt to reduce the number of bits being produced for the lookahead bitstream 112.

By way of a non-limiting example, encoding a complex portion of an input video 106 according to a normal rate control scheme can result in a lookahead bitstream 112 having more bits that can fit in the lookahead encoder buffer 116, causing overflow of the lookahead encoder buffer 116. This can occur in some situations even when the quantization parameter has been raised to its maximum value as part of a normal rate control scheme. When such overflow occurs, the lookahead encoder 102 can move from the normal rate control scheme to a panic rate control scheme to reduce the number of bits being produced for the lookahead bitstream 112 and stop overflow of the lookahead encoder buffer 116.

In some embodiments or situations, the lookahead encoder's panic rate control scheme can involve entirely skipping the encoding of frames 110 until enough space has been reclaimed in the lookahead encoder buffer 116 for additional data. This can impact visual quality of the lookahead bitstream 112, as skipping frames can lead to jerky video with inconsistent frame rates. Additionally, when the lookahead encoder 102 resumes encoding frames 110 after skipping some, there can be fewer already-encoded frames 110 in the buffer to reference with inter prediction, leading the lookahead encoder 102 to use intra prediction more frequently as it resumes encoding frames 110. As encoding a frame 110 with intra prediction can produce more bits than encoding with inter prediction, this can increase the chances of again overflowing the lookahead buffer 116 and skipping additional frames 110.

While the primary encoder 104 can separately encode copies of the same frames 110 as the lookahead encoder 102 according to the same video coding format and/or compression standard, the primary encoder 104 can determine from the lookahead information 120 when and/or why the lookahead encoder 102 moved from its normal rate control scheme to a panic rate control scheme. The primary encoder 104 can thus use the lookahead information 120 to take steps in an attempt to avoid skipping frames 110.

Figure 3:
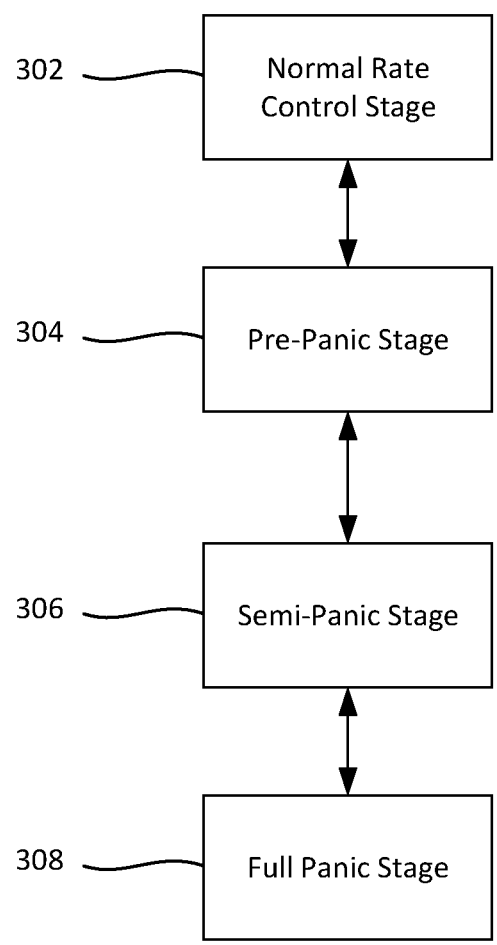
FIG. 3 depicts an embodiment of a multistage panic rate control scheme that can be used by a primary encoder that can access lookahead information produced by a lookahead encoder that encodes frames before the primary encoder separately encodes copies of those same frames.

FIG. 3 depicts an embodiment of a multistage panic rate control scheme that can be used by a primary encoder 104 that can access lookahead information 120 produced by a lookahead encoder 102 that encodes frames 110 before the primary encoder 104 separately encodes copies of those same frames 110. The multistage panic rate control scheme can comprise a normal rate control stage, a pre-panic stage, a semi-panic stage, and a full panic stage. The primary encoder 104 can adaptively move back and forth between these stages to attempt to keep the number of bits being produced in the primary bitstream 114 under a threshold value and/or keep the amount of data held in the primary encoder buffer 118 under a threshold value.

At step 302 the primary encoder 104 can be in a normal rate control stage, in which it encodes frames 110 using a normal rate control scheme. As with the lookahead encoder 102, when using a normal rate control scheme the primary encoder 104 can adjust the value of a quantization parameter 210 in an attempt to achieve an average target bitrate in the primary bitstream 114 while optimizing picture quality.

At step 304, the primary encoder 104 can be in a pre-panic stage. The primary encoder 104 can enter the pre-panic stage at a point in the input video 106 prior to a point at which the lookahead encoder 102 switched to a panic rate control scheme. By way of a non-limiting example, if the lookahead information 120 indicates that the lookahead encoder 102 encountered a panic scene that caused it to switch to a panic rate control scheme when encoding upcoming frames 110, the primary encoder 104 can move to the pre-panic stage before it encounters the panic scene.

During the pre-panic stage, the primary encoder 104 can process frames 110 differently than how the lookahead encoder 102 did, in an attempt to avoid overflowing the primary encoder buffer 118. When the primary encoder 104 determines from the lookahead information 120 that it is nearing a panic scene in the input video 106 that caused the lookahead encoder 102 to enter a panic rate control scheme, the primary encoder 104 can begin decreasing the bitrate for the frames 110 it is currently encoding, prior to reaching the panic scene. By way of a non-limiting example, the primary encoder 104 can decrease the value of its quantization parameter 210, which can in many situations lower the number of bits produced for the primary bitstream 114. As such, the primary encoder 104 can attempt to reduce the number of bits held within the primary encoder buffer 118 during the pre-panic stage, which can leave more memory available in the primary encoder buffer 118 for the more complex frames 110 of the upcoming panic scene. This can reduce the chances of overflowing the primary encoder buffer 118 when the primary encoder 104 begins to encode the panic scene.

In some embodiments, the primary encoder 104 can begin gradually increasing the value of the quantization parameter 210 N frames 110 prior to the beginning of the panic scene. By way of a non-limiting example, in some embodiments the primary encoder 104 can begin increasing the value of the quantization parameter 210 sixteen frames 110 prior to the start of the panic scene. Although increasing the value of the quantization parameter 210 can decrease image quality of encoded frames 110, the value of the quantization parameter 210 can be changed gradually by the primary encoder 104 during the lead-up to the panic scene such that the change in image quality is smooth over time and is thus not likely noticeable to most viewers.

Additionally, the value of the quantization parameter 210 can already be relatively low when the panic scene is reached, leading to fewer bits being produced when encoding the panic scene. By way of a non-limiting example, a panic scene often contains frames 110 that are much more complex than frames 110 of a preceding scene. The sudden jump in frame complexity can cause the lookahead encoder 102 to switch to a panic rate control scheme, as it attempts to encode the suddenly more complex frames 110 of the panic scene at the quality level appropriate for preceding simpler frames 110. However, when the primary encoder 104 has already lowered its quantization parameter 210 over time prior to reaching the panic scene during the pre-panic stage, the sudden jump in frame complexity can have less of an impact on the primary encoder 104 because the quality level can have already been set to a level more appropriate for complex frames 110 by the time the panic scene is reached.

Figure 4:
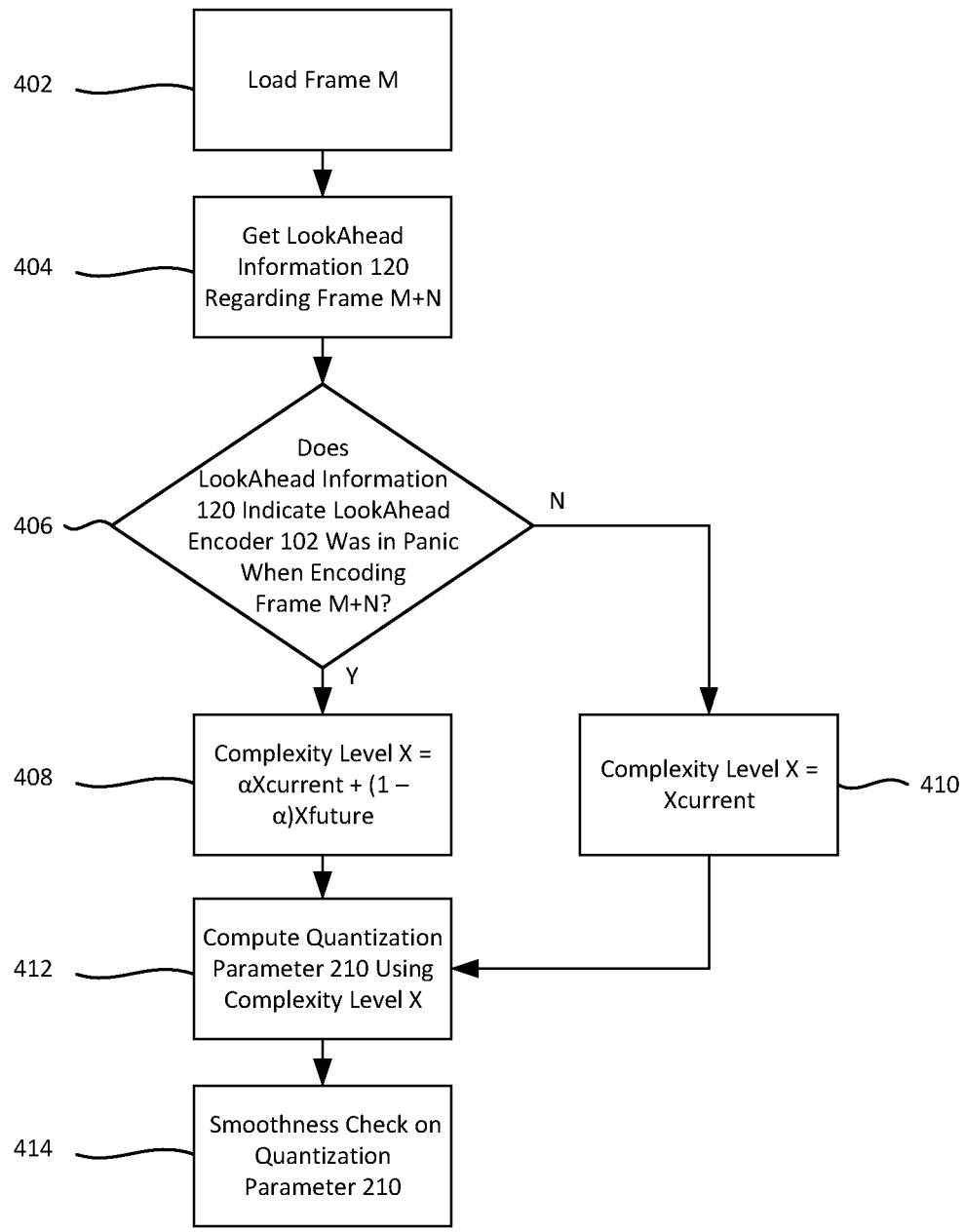
FIG. 4 depicts an exemplary process a primary encoder can follow in some embodiments of a pre-panic stage.

FIG. 4 depicts an exemplary process the primary encoder 104 can follow in some embodiments of the pre-panic stage.

At step 402, the primary encoder 104 can receive a new frame 110 from the frame buffer 124. The received frame 110 can be frame number M in the input video 106.

At step 404, the primary encoder 104 can retrieve lookahead information 120 from the lookahead information queue 122 that is associated with a frame 110 in the lookahead bitstream 112 that is N frames ahead of frame M in the input video 106.

At step 406, the primary encoder 104 can review the lookahead information 120 to determine whether or not the lookahead encoder 102 was processing a panic scene and using a panic rate control scheme when it encoded the frame 110 described by the lookahead information 120. If the lookahead information 120 indicates that the lookahead encoder 102 used a panic rate control scheme when encoding the frame 110, the primary encoder 104 can move to step 408 and change a complexity level value X in memory. If the lookahead information 120 indicates that the lookahead encoder 102 did not use a panic rate control scheme when encoding the frame 110, the primary encoder 104 can move to step 410 and continue using the current complexity level value X At step 408, the primary encoder 104 can change the complexity level value X in memory by obtaining the future complexity level of the upcoming panic scene from the lookahead information 120 and alpha blending the future complexity level with the current complexity level.

At step 412, the primary encoder 104 can use the complexity level value X determined in either step 408 or step 410 to calculate a value for the quantization parameter 210. By way of a non-limiting example, in some embodiments the quantization parameter 210 can be calculated by dividing the complexity level value X by the number of bits used to encode a frame 110. In some embodiments, an increase of the complexity level value X can increase the value of the quantization parameter 210, which can in turn tend to decrease the bitrate of the primary bitstream 114. As such, fewer bits can begin to be produced when the primary encoder 104 determines from the lookahead information 120 that a panic scene is nearing.

At step 414, the primary encoder 104 can determine if the quantization parameter 210 calculated in step 412 is too big of a change from the previous value of the quantization parameter 210, and if so can gradually change the quantization parameter to its new value over a series of frames 110. By way of a non-limiting example, the primary encoder 104 can limit the maximum change of the quantization parameter 210 from frame to frame, such that changes larger than the maximum value can be gradually carried out over multiple frames. As such, decreases in image quality over time in the output video 108 can be substantially smooth and gradual, decreasing the chances of a viewer noticing the quality change.

Returning to FIG. 3, at step 306 the primary encoder 104 can be in a semi-panic stage. During the semi-panic stage the primary encoder 104 can attempt to further reduce the bitrate of the primary bitstream 114 by discarding at least some transform coefficients 206 during the encoding process. In some embodiments, different transform coefficients 206 can be discarded depending on the complexity of the frames 110 in the panic scene and/or how close the primary encoder buffer 118 is to overflowing.

By way of a non-limiting example, low frequency transform coefficients 206 generally contribute more to image quality than higher frequency transform coefficients 206, but high frequency transform coefficients 206 generally take more bits to encode. As such, in some embodiments high frequency transform coefficients 206 can be discarded before lower frequency transform coefficients 206 are discarded, as in some cases this can reduce the bitrate of the primary bitstream 114 with relatively little impact on image quality. In some embodiment the primary encoder 104 can select transform coefficients 206 to discard that are above a threshold frequency level, with the threshold frequency level decreasing when the target bitrate decreases.

By way of another non-limiting example, transform coefficients 206 associated with P-frames generally contribute more to image quality than transform coefficients 206 associated with B-frames. As such, in some embodiments the transform coefficients 206 associated with B-frames can be discarded before transform coefficients 206 associated with P-frames are discarded.

In some embodiments the primary encoder 104 can move between sub-stages within the semi-panic stage, with each sub-stage specifying different types of transform coefficients 206 to discard, until the primary bitstream's bitrate is sufficiently reduced.

At step 308, the primary encoder 104 can be in a full-panic stage. During the full-panic stage the primary encoder 104 can attempt to further reduce the bitrate of the primary bitstream 114 by skipping the encoding of one or more frames 110. In some embodiments, the primary encoder 104 can select frames 110 to skip based on which have the least impact on video quality. By way of a non-limiting example, B-frames can be skipped before P-frames, as B-frames generally contribute less to video quality than P-frames. By way of another non-limiting example, in embodiments in which the input video 106 is interlaced, the top and bottom fields can be skipped together. In some embodiments, when the primary encoder 104 begins skipping P-frames, B-frames in the same sub-GOP as the skipped P-frame can also be skipped to preserve display order of the frames 110.

In some embodiments, the primary encoder 104 can use bitrate reduction techniques of the semi-panic stage in combination with frame skipping techniques of the full-panic stage. By way of a non-limiting example, FIG. 5 depicts an embodiment in which a multistage panic rate control scheme has six granular levels, with each level having a panic control action specifying the type of data to discard or skip at that level. In other embodiments, the a multistage panic rate control scheme can have more or fewer levels, and/or can specify different types of data to discard at each level. Some levels combine elements of the semi-panic stage and the full-panic stage, such that the primary encoder can gradually move between the semi-panic stage and the full-panic stage over time.

As shown in the exemplary embodiment of FIG. 5, in some embodiments the primary encoder can begin at Panic Level 0, in which the primary encoder 104 can use either a normal rate control scheme or can begin to lower the quantization parameter in a pre-panic stage before a detected panic stage begins.

However, if the techniques in place at Panic Level 0 do not sufficiently reduce the primary bitstream's bitrate such that the risk of overflowing the primary encoder buffer 118 is reduced to a threshold level, the primary encoder can move to Panic Level 1, a preliminary version of a semi-panic stage. At Panic Level 1, the primary encoder 104 can discard all AC transform coefficients 206 of B-frames.

If Panic Level 1 does not sufficiently reduce the primary bitstream's bitrate, the primary encoder 104 can move to Panic Level 2, a second version of the semi-panic stage. At Panic Level 2, the primary encoder 104 can discard all AC transform coefficients 206 of B-frames, plus all AC transform coefficients 206 of P-frames except for the first.

If Panic Level 2 does not sufficiently reduce the primary bitstream's bitrate, the primary encoder 104 can move to Panic Level 3, a third version of the semi-panic stage. At Panic Level 3, the primary encoder 104 can discard all AC and DC transform coefficients 206 of B-frames, as well as all AC and DC transform coefficients 206 of P-frames.

If Panic Level 3 does not sufficiently reduce the primary bitstream's bitrate, the primary encoder 104 can move to Panic Level 4, a transitional mix of the semi-panic stage and the full-panic stage. At Panic Level 4, the primary encoder 104 can discard all AC and DC transform coefficients 206 of P-frames, plus skip the encoding of B-frames entirely.

Finally, if Panic Level 4 does not sufficiently reduce the primary bitstream's bitrate, the primary encoder 104 can move to Panic Level 5. Panic Level 5 can be a version of the full panic stage, in which the primary encoder 104 skips the encoding of all B-frames and all P-frames.

In some embodiments, the primary encoder 104 can limit its movement between Panic Levels over time, such that there is not a sudden increase or decrease in picture quality in the primary bitstream 114 that is likely to be noticed by a viewer. In some embodiments, the frequency at which the primary encoder 104 can move up or down a Panic Level can be governed by a panic level change control rule set. FIG. 6 depicts a non-limiting exemplary embodiment of a panic level change control rule set having rules a primary encoder 104 can follow to control how quickly the Panic Level can be changed in an embodiment of the multistage panic rate control scheme that has six granular levels, such as the embodiment shown in FIG. 5. In other embodiments, the primary encoder 104 can follow other rules that specify different rates of change between Panic Levels.

In the embodiment shown in FIG. 6, the primary encoder 104 can move up to the next highest Panic Level at most once every time it encounters a sub-GOP that the lookahead information 120 indicates was processed by the lookahead encoder 102 with a panic rate control scheme. As described above, a sub-GOP can be a series of consecutive frames 110 positioned between P or I frames 110, such as a group of four frames 110. As such, the Panic Level can be increased smoothly and gradually as each additional panic sub-GOP is encountered.

Also in the embodiment shown in FIG. 6, the primary encoder 104 can move to the next lowest Panic Level, if any, at varying rates. When the primary encoder is at one of the two highest Panic Levels, Panic Levels 4 and 5, the primary encoder 104 can move down to the next lowest Panic Level every time it encounters a sub-GOP that the lookahead information 120 indicates was processed by the lookahead encoder 102 with a normal rate control scheme. At Panic Level 3, the primary encoder 104 can move down to the next lowest Panic Level if it encounters two sub-GOPs in a row that the lookahead information 120 indicates were processed by the lookahead encoder 102 with a panic rate control scheme. At Panic Levels 1 and 2, the primary encoder 104 can move down to the next lowest Panic Level if it encounters three sub-GOPs in a row that the lookahead information 120 indicates were processed by the lookahead encoder 102 with a panic rate control scheme.

In some embodiments the primary encoder 104 can decrease the Panic Level more quickly at higher Panic Levels than at lower Panic Levels. Additionally, in some embodiments the Panic Level can be increased more quickly than it can be decreased, to assist in avoiding quickly oscillating between higher and lower Panic Levels.

Figure 7:
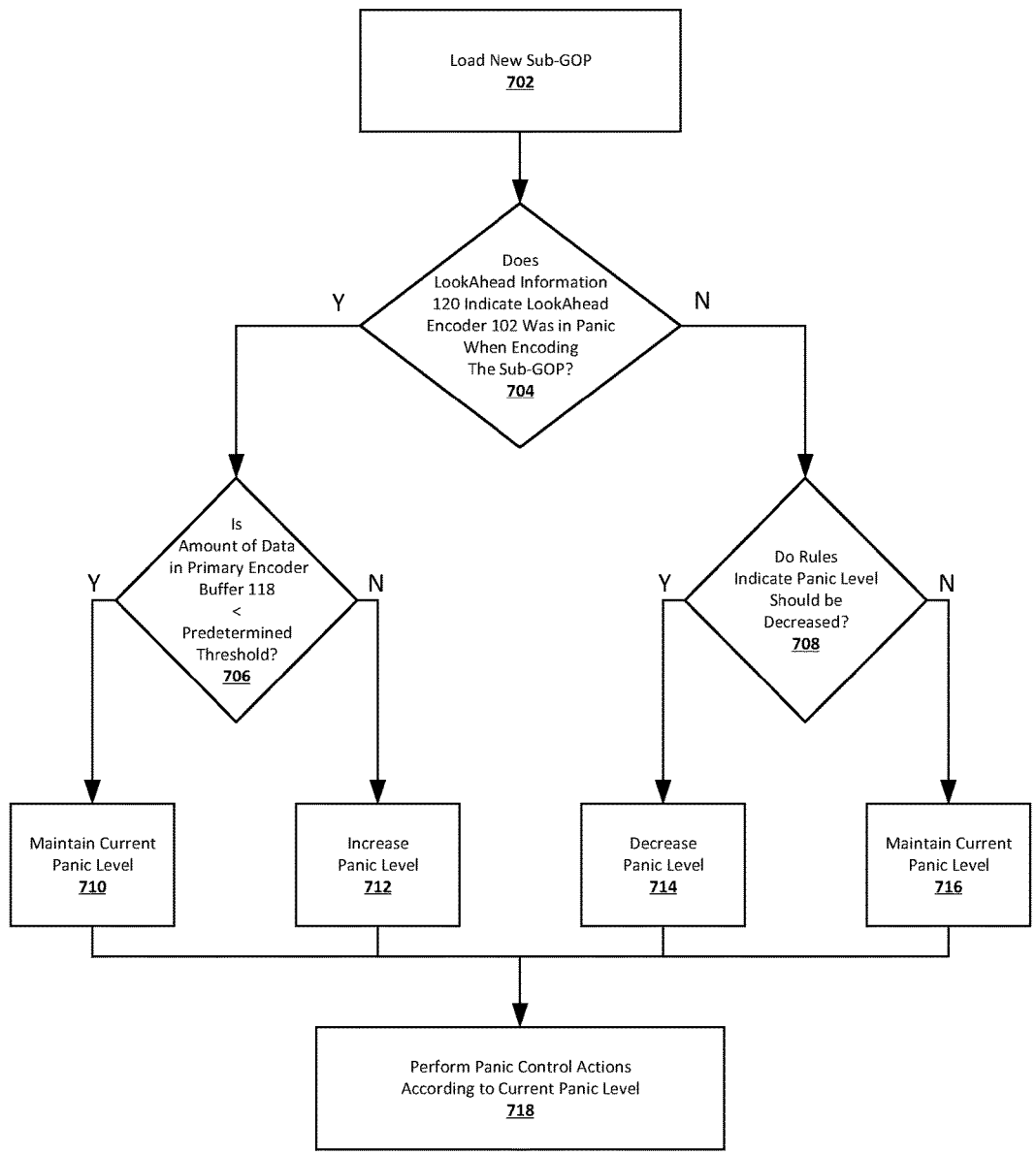
FIG. 7 depicts a flow chart of an exemplary embodiment of a process for a primary encoder to determine whether or not to move between Panic Levels in a multistage panic rate control scheme, such as when the primary encoder is in a semi-panic or full panic stage.

FIG. 7 depicts a flow chart of an exemplary embodiment of a process for a primary encoder 104 to determine whether or not to move between Panic Levels in a multistage panic rate control scheme, such as when the primary encoder is in a semi-panic or full panic stage.

At step 702, the primary encoder 104 can receive a new sub-GOP comprising a group of frames 110 from the frame buffer 124.

At step 704, the primary encoder 104 can retrieve lookahead information 120 from the lookahead information queue 122 that is associated with the frames 110 of the sub-GOP received in step 702. The primary encoder 104 can review the lookahead information 120 to determine whether or not the lookahead encoder 102 processed the frames 110 of the sub-GOP with a panic rate control scheme.

If the lookahead information 120 indicates that the lookahead encoder 102 did process the sub-GOP with a panic rate control scheme, the primary encoder 104 can move to step 706 to compare the amount of data currently stored in the primary encoder buffer 118 against a predetermined threshold. If the amount of data in the primary encoder buffer 118 is under the predetermined threshold, the number of bits being produced for the primary bitstream 114 is likely under control and the current Panic Level is likely sufficient for the scene's current complexity. As such, the primary encoder can maintain the current level at step 710. However, if the amount of data in the primary encoder buffer 118 is found to be at or above the predetermined threshold during step 706, the number of bits being produced for the primary bitstream 114 may run the risk of overflowing the primary encoder buffer 118 in the near future. As such, the primary encoder 104 can move to step 712 to increase the Panic Level according to a rule set such as the exemplary one shown in FIG. 6, in an attempt to lower the number of bits being produced and reduce the risk of buffer overflow. After maintaining the current value of the Panic Level at step 710 or increasing the Panic Level at step 712, the primary encoder can move to step 718.

Returning to step 704, if the lookahead information 120 indicates that the lookahead encoder 102 did not process the sub-GOP with a panic rate control scheme, the primary encoder 104 can move to step 708 to determine from a rule set such as the exemplary one shown in FIG. 6 whether or not the current Panic Level should be decreased. If the rule set indicates that the Panic Level should be decreased, the primary encoder can do so according to the rule set at step 714. By way of a non-limiting example, if the primary encoder 104 is at Panic Level 3 and has received two non-panic sub-GOPs in a row, it can lower itself to Panic Level 2 when following the rule set of FIG. 6. However, if the rule set indicates that the Panic Level should not be decreased yet, the primary encoder can maintain the current Panic Level at step 716. By way of a non-limiting example, if the primary encoder 104 is at Panic Level 2 and has received two non-panic sub-GOPs in a row, but has not yet received three in a row, it can keep itself at Panic Level 2 when following the rule set of FIG. 6. After lowering the Panic Level at step 714 or maintaining its current value at step 716, the primary encoder can move to step 718.

At step 718, after the Panic Level has been maintained or adjusted up or down during previous steps, the primary encoder 104 can take one or more panic control actions designated by the current Panic Level. By way of a non-limiting example, the primary encoder 104 can refer to a table of panic control actions, such as the exemplary table shown in FIG. 5, to look up which panic control actions to implement at the current Panic Level.

Figure 8:
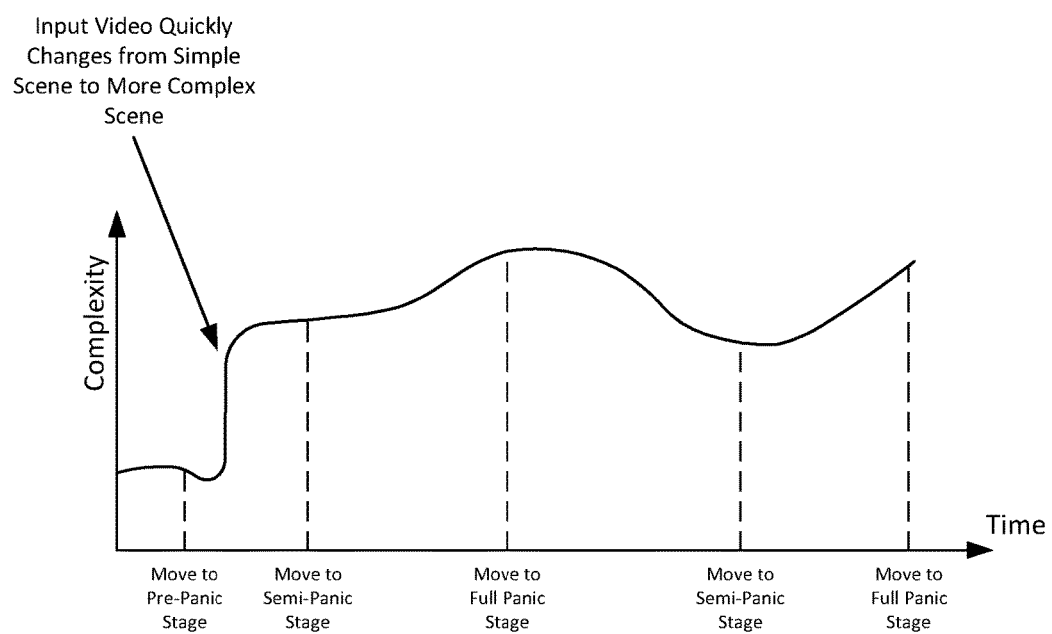
FIG. 8 depicts a non-limiting example of how a primary encoder can move between the stages of a multistage panic rate control scheme over time as the complexity of an input video changes.

FIG. 8 depicts a non-limiting example of how the primary encoder 104 can move between the stages of a multistage panic rate control scheme over time as the complexity of the input video 106 changes. As shown in FIG. 8, the input video 106 can begin with a relatively simple scene that the encoders can handle with a normal rate control scheme. However, it then quickly increases dramatically in complexity when it changes to a different scene. The primary encoder 104 can determine from the lookahead information 120 while it is processing the early simple scene that a panic scene is coming up that caused the lookahead encoder 102 to switch to a panic rate control scheme. As such, it can switch to a pre-panic stage and process the remaining portions of the simple scene in the pre-panic stage, such as by gradually increasing the quantization parameter 210.

The primary encoder 104 can continue processing the input video 106 in the pre-panic stage as the input video 106 transitions to the more complex scene. When the pre-panic stage becomes insufficient to keep the number of bits being produced for the primary bitstream 114 under a predetermined threshold, such as if the complexity of the scene keeps increasing, the primary encoder 104 can move to a semi-panic stage to implement its more aggressive bitrate reduction techniques. If the complexity of the scene continues to increase and the semi-panic stage becomes insufficient to keep the number of bits being produced for the primary bitstream 114 under the predetermined threshold, the primary encoder 104 can move to a full panic stage and begin dropping at least some frames. When the complexity of the scene decreases and/or the number of bits being produced for the primary bitstream 114 falls under the predetermined threshold, the primary encoder 104 can return to the semi-panic stage. The primary encoder 104 can continue to adaptively move up or down between the stages, or between more granular levels within each stage, as appropriate to keep the number of bits being produced below the threshold level and to avoid overflowing the primary encoder buffer 118.

As such, a multistage panic rate control scheme can adaptively vary the bitrate of the primary bitstream 114 over time to reduce the chances of dropping frames altogether, which can be generally preferred by viewers watching the output video 108.

The processes for implementing a multistage panic rate control scheme have been described above in use with a dual-pass encoder comprising a lookahead encoder 102 and a primary encoder 104. However in alternate embodiments a multistage panic rate control scheme can be implemented with a multi-pass encoder comprising more than two encoders, when at least one encoder processes an input video 106 at least partially ahead of other encoders and provides lookahead information 120 to the other encoders such that the other encoders can change how they separately process the input video 106 depending on the results of the lookahead encoder's processing of the input video.

Although the present invention has been described above with particularity, this was merely to teach one of ordinary skill in the art how to make and use the invention. Many additional modifications will fall within the scope of the invention, as that scope is defined by the following claims.

The invention claimed is:
1. A method of encoding video, comprising:
receiving an input video;
routing frames of said input video to a lookahead encoder and to a frame buffer;
processing said frames with said lookahead encoder into a lookahead bitstream and temporality storing bits of said lookahead bitstream in a lookahead encoder buffer;
generating lookahead information with said lookahead encoder and storing said lookahead information in a lookahead information queue, wherein said lookahead information indicates whether or not said lookahead encoder encoded portions of said lookahead bitstream using a panic rate control scheme to avoid overflowing said lookahead encoder buffer;
loading said frames into a primary encoder from said frame buffer, such that said primary encoder receives said frames on a delayed basis relative to said lookahead encoder;
reviewing said lookahead information with said primary encoder to determine which portions of said input video caused said lookahead encoder to process portions of said lookahead bitstream using said panic rate control scheme, and in response encoding said portions of said input video with a multistage panic rate control scheme comprising:
a pre-panic stage during which said primary encoder gradually reduces a quantization parameter while encoding said portions of said input video;
a semi-panic stage during which said primary encoder discards at least some transform coefficients while encoding said portions of said input video; and
a full panic stage during which said primary encoder skips the encoding of at least some frames within said portions of said input video,
wherein said primary encoder is configured to adaptively move between said pre-panic stage, said semi-panic stage, and said full panic stage to keep an amount of data stored within said primary encoder buffer below a predetermined threshold,
wherein said pre-panic stage comprises:
loading a frame to said primary encoder from said frame buffer;
reviewing lookahead information with said primary encoder that is related to a future frame at a predetermined number of frames ahead of said frame;
adjusting a complexity level value at said primary encoder when said lookahead information indicates that said future frame was processed by said lookahead encoder using said panic rate control scheme;
calculating a new value for said quantization parameter based on said complexity level; and
encoding said frame using said new value for said quantization parameter. and
wherein said complexity level value is adjusted by alpha blending a current value for said complexity level with a future value for said complexity level described by said lookahead information.

2. The method of claim 1, wherein when said new value for said quantization parameter is different from an immediately previous value for said quantization parameter by more than a threshold value, the value of said quantization parameter is gradually changed over multiple frames until said new value is reached.

3. The method of claim 1, wherein said semi-panic stage and said full panic stage together comprise a plurality of granular panic levels, and said primary encoder is configured to adaptively move between said plurality of granular panic levels to keep the amount of data stored within said primary encoder buffer below said predetermined threshold.

4. The method of claim 1, wherein said semi-panic stage and said full panic stage together comprise:
loading a new sub-GOP comprising a series of frames to said primary encoder from said frame buffer;
reviewing lookahead information with said primary encoder that is related to the frames of said sub-GOP;
lowering said primary encoder to a lower one of said plurality of granular panic levels from a current panic level according to a panic level change control rule set when said lookahead information indicates that the frames of said sub-GOP was processed by said lookahead encoder without using said panic rate control scheme;
increasing said primary encoder to a higher one of said plurality of granular panic levels from said current panic level according to said panic level change control rule set when said lookahead information indicates that the frames of said sub-GOP was processed by said lookahead encoder using said panic rate control scheme and the amount of data stored within said primary encoder buffer is above said predetermined threshold; and performing one or more panic control actions based on the primary encoder's panic level.

5. The method of claim 4, wherein said panic level change control rule set comprises:

rules allowing an increase of said panic level by one level for each sub-GOP processed by said lookahead encoder using said panic rate control scheme.

6. The method of claim 4, wherein said panic level change control rule set comprises:

a first set of rules allowing a decrease of said panic level by one level from at least one high level for each sub-GOP processed by said lookahead encoder without using said panic rate control scheme;

a second set of rules allowing a decrease of said panic level by one level from at least one medium level for each group of two sub-GOPs in a row that were processed by said lookahead encoder without using said panic rate control scheme; and a third set of rules allowing a decrease of said panic level by one level from at least one low level for each group of three sub-GOPs in a row that were processed by said lookahead encoder without using said panic rate control scheme.

7. The method of claim 4, wherein said more panic control actions comprise:

discarding all AC transform coefficients of bidirectionally predicted B-frames in said sub-GOP at a first panic level;

discarding all AC transform coefficients of B-frames in said sub-GOP and all except for the first AC transform coefficients of forward predicted P-frames in said sub-GOP at a second panic level;

discarding all AC and DC transform coefficients of B-frames in said sub-GOP and all AC and DC transform coefficients of P-frames in said sub-GOP at a third panic level;

discarding all AC and DC transform coefficients of P-frames in said sub-GOP and skipping the encoding of all B-frames at a fourth panic level; and skipping the encoding of all B-frames and all P-frames at a fifth panic level.

* * * * *